United States Patent [19]
Shah et al.

[11] Patent Number: 5,761,427
[45] Date of Patent: Jun. 2, 1998

[54] METHOD AND APPARATUS FOR UPDATING HOST MEMORY IN AN ADAPTER TO MINIMIZE HOST CPU OVERHEAD IN SERVICING AN INTERRUPT

[75] Inventors: Bhupendra Shah, Boxboro; Peter J. Roman, Hopkinton, both of Mass.; Michael Ben-Nun, Jerusalem, Israel; Kadangode K. Ramakrishnan, Gillette, N.J.

[73] Assignee: Digital Equipment Corporation, Maynard, Mass.

[21] Appl. No.: 892,331

[22] Filed: Jul. 14, 1997

Related U.S. Application Data

[63] Continuation of Ser. No. 365,632, Dec. 28, 1994, abandoned.

[51] Int. Cl.$^6$ .................................................. G06F 13/00
[52] U.S. Cl. ............... 395/200.53; 395/733; 395/800.01
[58] Field of Search .................. 395/800.01, 800.28, 395/800.4, 200.31, 200.47, 200.53, 200.68, 200.8, 287, 309, 733, 736, 739, 740; 370/254, 401, 402

[56] References Cited

U.S. PATENT DOCUMENTS

| | | | |
|---|---|---|---|
| 4,777,595 | 10/1988 | Strecker et al. | 395/200.17 |
| 4,972,368 | 11/1990 | O'Brien et al. | 395/887 |
| 4,999,768 | 3/1991 | Hirokawa | 395/200.07 |
| 5,067,123 | 11/1991 | Hyodo et al. | 370/58.1 |
| 5,193,149 | 3/1993 | Awiszio et al. | 395/200.2 |
| 5,446,726 | 8/1995 | Rostoker et al. | 370/17 |
| 5,506,847 | 4/1996 | Shobatake | 370/94.3 |
| 5,535,197 | 7/1996 | Cotton | 370/60 |

*Primary Examiner*—Alpesh M. Shah
*Attorney, Agent, or Firm*—Kenneth F. Kozik; A. Sidney Johnston

[57] ABSTRACT

In an asynchronous transfer network (ATM), to prevent the bottleneck associated with a host central processing unit (CPU) trying to receive status information for a plurality of interrupts occurring over an interface input/output (I/O) bus, a method and apparatus which transfers all status information directly to the host memory without host involvement. The host CPU is then notified of this new status information via an interrupt. When status information is transferred to the host memory, consistency is ensured and the number of spurious interrupts are reduced. A host software driver may then read the latest status information from the interface I/O bus at its convenience any not incur any performance penalties of I/O accesses.

4 Claims, 7 Drawing Sheets

METHOD AND APPARATUS FOR UPDATING HOST MEMORY IN AN ADAPTER TO MINIMIZE HOST CPU OVERHEAD IN SERVICING AN INTERRUPT

This application is a continuation of application Ser. No. 08/365,632, filed Dec. 28, 1994, now abandoned.

FIELD OF THE INVENTION

This invention relates generally to the field of computer networks, and more particularly to a method and apparatus for updating host memory in a network adapter to minimize host central processing unit (CPU) overhead in servicing interrupts, interrupt latency, and probability of spurious interrupts.

BACKGROUND OF THE INVENTION

In general terms, a computer network is a collection of end systems (also known as nodes) interconnected through one or more communication links. Generally, the end systems both send data to other end systems on the network and receive data sent by other end systems on the network. When an end system is a sender of data, it is referred to as a source for that data; when it is a receiver of data, it is referred to as a destination for the data. Typically, end systems act as both sources and destinations depending on whether they are sending or receiving data. When acting as a source, the system typically sends data in the form of messages over a communication link. Messages can flow back and forth to other communication links and end systems within the network through bridges, routers, switches or other such devices, which are used to interconnect multiple communication links.

Each message comprises a sequence of bits. Typically, messages sent over a network are divided up into smaller blocks of information called packets. The flow of packets in the network is usually referred to as traffic.

Asynchronous Transfer Mode (ATM) is one of the general class of digital switching technologies that relay and route traffic by means of a virtual circuit identifier (VCI and VPI). Unlike common packet technologies, such as X.25 or frame relay, ATM uses very short, fixed length units of information, called cells, each of which contains a VCI/VPI. In applications utilizing ATM, packets at a source are first broken up into these fixed length cells, transmitted, and then reassembled at a destination. ATM cells are 53 bytes long. They consist of a 5-byte header (containing, among other things, the VCI/VPI, which implicitly identifies the source address and the destination address) and a 48-byte information field. The header of an ATM cell contains all the information the network needs to relay the cell from one node to the next over a pre-established route. User data is contained in the remaining 48 bytes.

Thus, ATM uses a dual process of segmentation and reassembly. Segmentation is the process of breaking up packets of data into fixed length cells. Reassembly is the process of reconstructing the fixed length cells into packets of data. The segmentation and reassembly process typically occurs in a network adapter which is resident in an end node on the network.

It is well known in the art that ATM is a network technology which permits a large number of users to have high speed connections with each other and with high performance network servers. These connections, which are virtual or logical in nature, share common physical links. The nature of ATM is the ability to provide a dedicated bandwidth to each connection. An ATM adapter board allows an ATM connection to a host machine via the host machine's input/output (I/O) bus. It is typical for an adapter to send and receive packets to/from the host machine. The ATM adapter may then break up each packet into cells for transmission on to the network. The typical indication of a packet being received or having completed transmission by the adapter to the host is through an interrupt. Upon receiving an interrupt, the host performs the required work for the packet: first by retrieving status information related to the packet, and subsequently receiving the data packet or processing the completion of the packet. When the data link is a high speed network, the rate at which packets are sent and received can be high.

It is also well known in the art that, for an ATM adapter board, there exists a potential performance bottleneck if the host CPU to get status information for every interrupt via traditional I/O cycles over the interface bus. This problem exists due to the high overhead of arbitrating for the bus among many I/O devices in any modern system. During this arbitration period, the host CPU may have to wait while the bus is being used by some other interface device. This results in a bottleneck in the host CPU due to the excessive overhead of going to the I/O device to retrieve status information. With today's high speed CPUs, this results in an ever increasing number of CPU cycles "wasted" during this waiting period. If the CPU has other work to do, even though this doesn't result in CPU cycles being wasted, it involves additional latency.

A method of avoiding this bottleneck is needed whereby status information is transferred directly to the host memory without CPU involvement. When the status information is transferred to the host memory, considerations must be taken to insure consistency and to reduce the number of spurious interrupts. These considerations are important because the interrupt line is separated from the status information on which the interrupt is based.

SUMMARY OF THE INVENTION

In accordance with the present invention, a network station is provided containing a host, the host having a central processing unit (CPU) connected to a host memory, a bridge, and a system input/output (I/O) bus, an adapter, the adapter connected to the host via a system bus, the adapter having a direct memory access (DMA) engine, a transmit packet memory, a control logic having a status DMA engine, and a link interface, means, in the host memory, for maintaining status information of a plurality of interrupts without the intervention of the CPU, and a communication line from the link interface to the ATM network. With such an arrangement, all status information is directly transferred to the host memory without host involvement. The host CPU is then notified of this new status information via an interrupt. When status information is transferred to the host memory, consistency is ensured and the number of spurious interrupts are reduced. A host software driver may then read the latest status information from the interface I/O bus at its convenience ant not incur any performance penalties of I/O accesses.

BRIEF DESCRIPTION OF THE DRAWINGS

The novel features believed characteristic of the invention are set forth in the appended claims. The invention itself, however, as well as features and advantages thereof, will be best understood by reference to the detailed description of specific embodiments which follows, when read in conjunction with the accompanying drawings, wherein:

DETAILED DESCRIPTION

Figure 1:
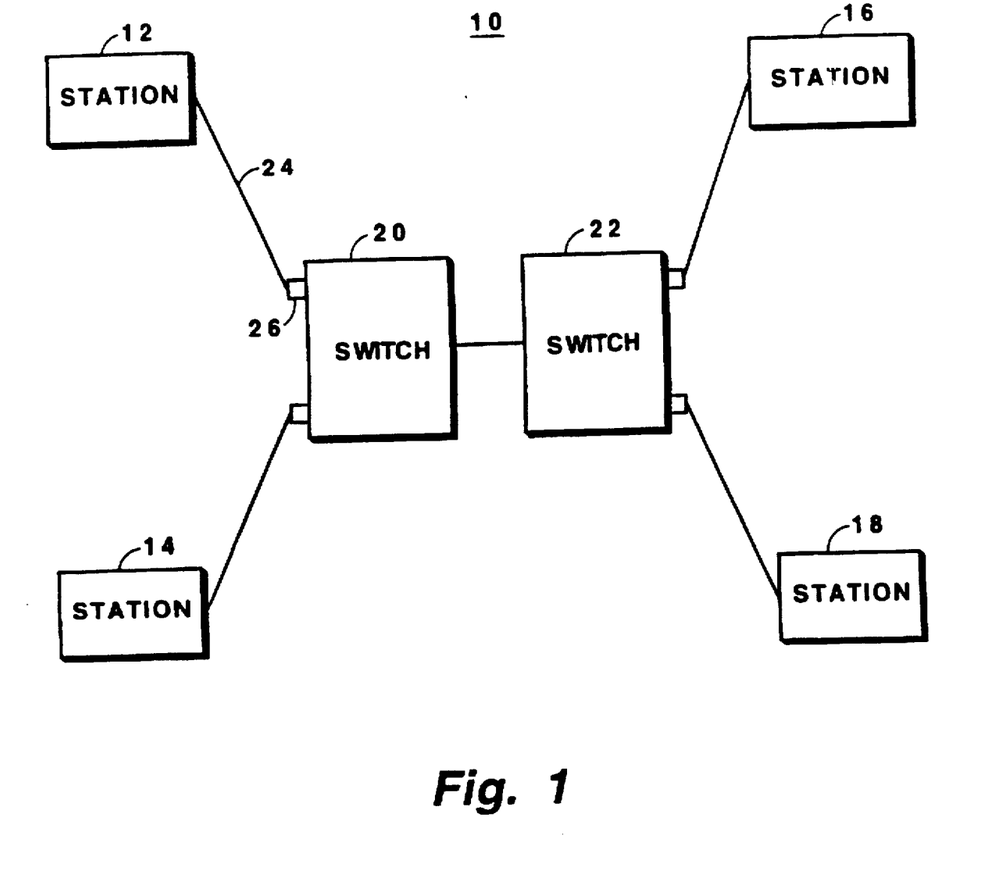
FIG. 1 is a block diagram showing an exemplary Asynchronous Transfer Mode (ATM) local area network (LAN)

Referring to FIG. 1, an exemplary Asynchronous Transfer Mode (ATM) local area network (LAN) 10 is shown to include four stations labeled as 12, 14, 16, and 18, respectively. The ATM network 10 is also shown to include two ATM switches labeled as 20 and 22, respectively. An ATM adapter resides in each of the stations 12, 14, 16, and 18. By way of example, if station 12 is transmitting packets to station 16, the ATM adapter in station 12 is involved in segmenting the packets into cells, and affixing the appropriate fields in the cell headers. The ATM adapter in station 16 is involved in reassembling the cells received into complete packets and delivering the packets to station 16. Control of the ATM network 10 resides in the ATM switches 20 and 22, which route messages between stations. For example, station 12 may send a cell over a line 24 to ATM switch 20 through port 26. ATM switch 20 will route the cell to a destination, Station 16, for example, according to the VCI/VPI in the ATM cell header of the cell.

Because port 26 is dedicated to station 12, other stations (14 for example) do not have to contend for access to the ATM switch 20. Thus, station 12 has full access to the line 24 regardless of the activity of other stations. For example, if a 5 Mb file is being transmitted from station 12 to station 16, it can move to the ATM switch 20 in a continuous burst at the full channel rate, instead of sharing the communication line 24 with the other stations and having intervening frames from other stations as with other LANs, such as Ethernet, Token Ring, and Fiber Distributed Data Interface (FDDI) LANs.

Figure 2:
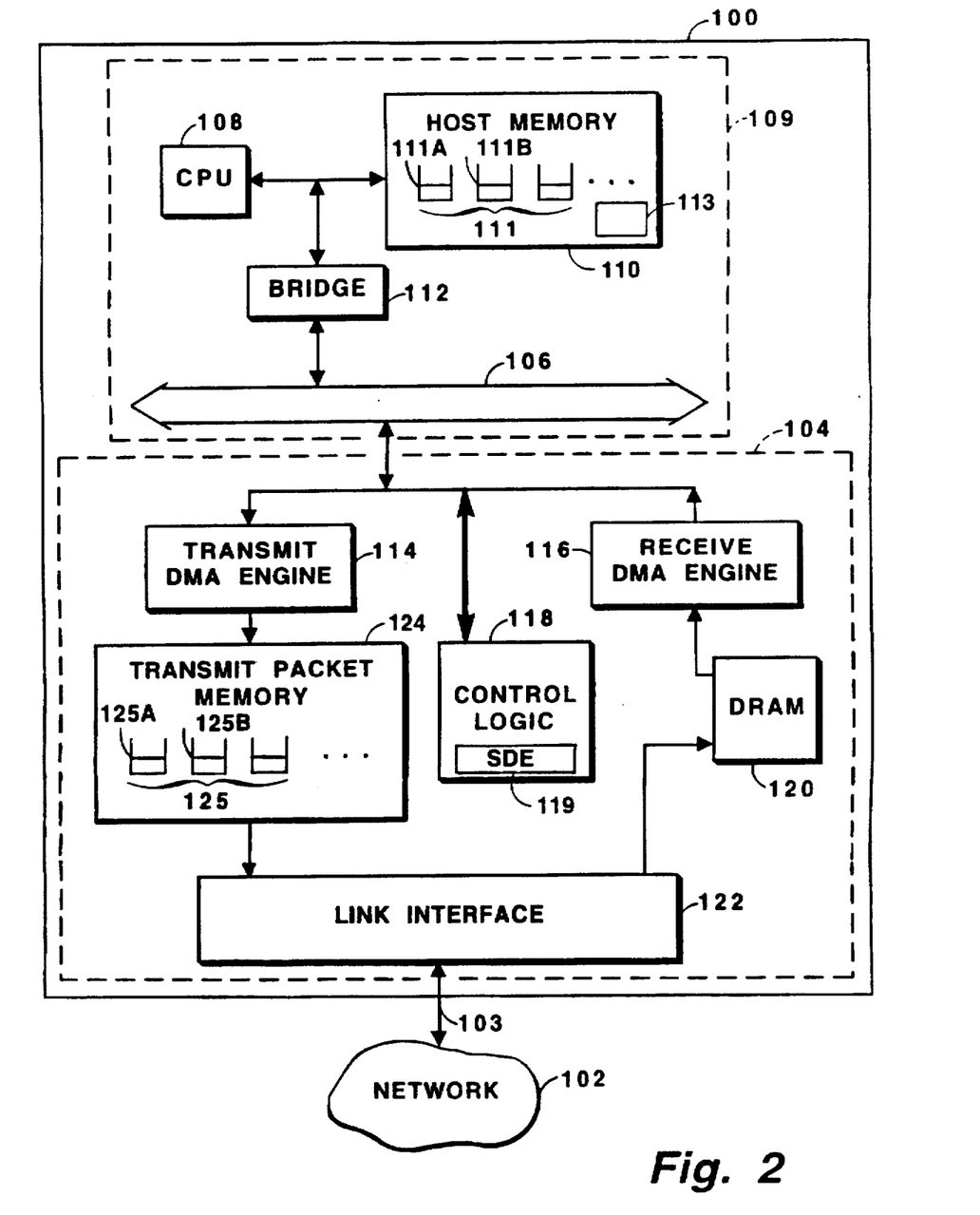
FIG. 2 is a block diagram of an exemplary network station on a computer network, including an exemplary ATM adapter.

Referring to FIG. 2, a diagram of a network station 100 is shown coupled to a network 102 via a communications link 103. The network station 100 shown in FIG. 2 is an exemplary embodiment of any one of network station 12, network station 14, network station 16, or network station 18, as shown in FIG. 1. The network station 100 includes a network adapter 104 coupled to a system I/O bus 106, a central processing unit (CPU) 108 coupled to the system I/O bus 106 through a bridge 112, and a host 109. For purposes of example, the network adapter 104 is an ATM network adapter, and the network 102 is an ATM network.

The host 109 is further shown to include a host memory 110. The adapter 104 is further shown to include a transmit DMA engine 114, a receive DMA engine 116, a transmit packet memory (TPM) 124, a control logic 118 which is shown to include a status DMA engine (SDE) 119, a DRAM device 120, and a link interface 122.

By way of example, ATM cells received by network station 100 via a communications link 103 are reassembled into packets in ATM adapter 104 and sent via the system I/O bus 106 to the host memory 110. On the other hand, packets which are transmitted from the network station 100 are sent from host memory 110 via the system I/O bus 106 to ATM adapter 104. While in ATM adapter 104, packets are segmented into ATM cells and sent out to ATM network 102 via the communications link 103. The host memory 110 contains a plurality of queues 111 and the transmit packet memory contains a plurality of queues 125. Each one of the plurality of queues 111 in the host memory 110 has a one to one correspondence to each one of the plurality of queues 125 in the transmit packet memory 124. For example, a queue 111A will correspond to a queue 125A, while a queue 111B will correspond to a queue 125B.

Figure 3:
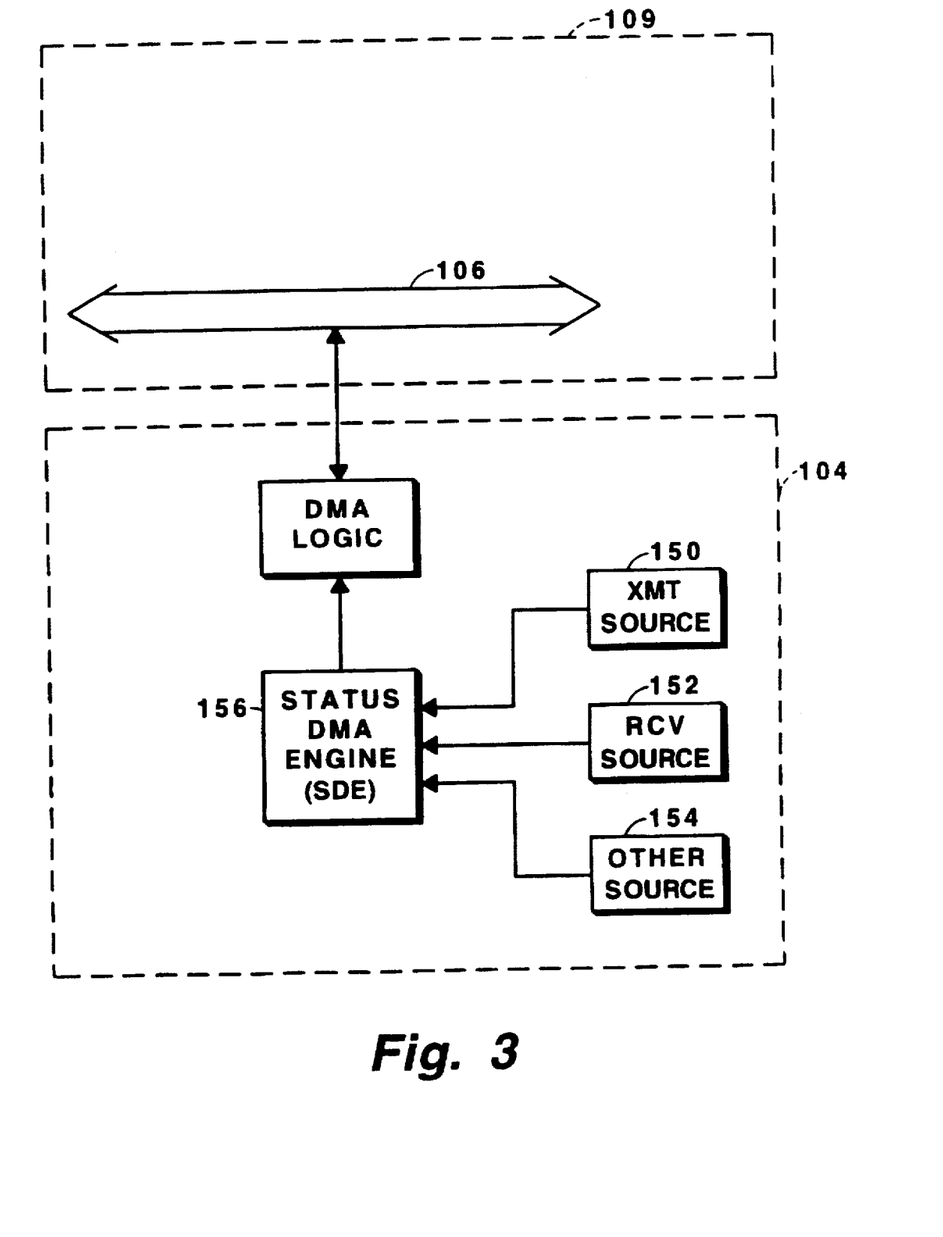
FIG. 3 is a block diagram illustrating some sources of interrupts.

As mentioned above, there exists a potential performance bottleneck if the host CPU 108 has to get status information for every interrupt via traditional I/O cycles over the system I/O bus 106. Referring now to FIG. 3, various sources of interrupt that exist in the ATM adapter 104 and in the system I/O bus 106 are illustrated. As seen in FIG. 3, interrupts may arise from a transmit source 150, a receive source 152, or generically from other sources 154. When an interrupt occurs, the host CPU must determine the source of the interrupt, in order to execute the actions appropriate to processing the interrupt. If the CPU must access registers in the adapter 104 in order to do so, it must first obtain access to the system I/O bus 106. Since the system I/O bus 106 is a resource which is shared among many different entities in the host (e.g., disks), the host CPU 108 must usually wait for the duration of an arbitration period while the system I/O bus 106 is being used by these other entities. This arbitration period is usually poorly characterized, variable, and quite large relative to the CPU's cycle time. Waiting for the system I/O bus therefore creates a bottleneck in the performance of the adapter. It should be noted that the CPU may not 'wait' for the access to the system I/O bus, while others are contending for it. The CPU usually has some form of priority, or it may be able to go off and do something else in the meantime. But, even when the CPU does get access to the bus, it takes far more cycles to get something from the I/O device, than from memory. This overhead is what the present invention is trying to avoid.

To avoid this bottleneck, the present invention transfers all status information related to interrupts directly to a Status Block in host memory 110 (of FIG. 2) without involvement of the host CPU 108. The host CPU 108 is then notified of the new status information contained in the Status Block via an interrupt after the status information has been transferred to the host memory 110. The host software driver may thus read the latest status information from the host memory 110 without incurring the performance penalties of I/O accesses. This is fully described below.

As mentioned previously, the adapter 104 contains DMA engines that enable the adapter 104 to DMA from host memory 110 to the packet memory 124 on the adapter 104, and the adapter 104 to DMA information to the host memory 1 10. The basis of these DMA engines is the IEEE Std P1212.1 circular queue model.

The underlying concept of the DMA engine is the circular queue. A circular queue consists of a fixed size array of data buffer descriptors describing data buffer segments in data buffers and two indices, termed the producer and consumer. A data buffer is a logically contiguous region of host memory that contains all the data of a single packet to be transmitted to the physical media. A data buffer has one or more buffer segments. Each buffer segment is a physically contiguous region of host memory that contains a portion of the data to be transmitted. There is exactly one descriptor to describe one buffer segment. A descriptor, among other functions, describes the length and physical address of a data buffer segment in host memory.

An index is a number from 0 to n−1, where n is the number of entries in the circular queue. To increment an index, add 1 to its current value. If the result is the value n, the value of the index is set back to 0. A producer index is the entry into the circular queue at which buffer descriptors are written. A consumer index is the entry into the circular queue at which the DMA engine reads the buffer descriptors. The producer index is incremented only by a producer, and the consumer index is incremented only by a consumer.

A producer may write a buffer descriptor (i.e., produce) that describes:

For a receive queue, a buffer that is "empty". The host usually produces empty buffers that are made available to the adapter for the received data.

For a transmit queue, a buffer that is "full" (contains data).

Similarly, a consumer may consume either an "empty" buffer or a "full" buffer.

A queue is empty if the following condition is true:
Producer =Consumer

A queue is full if the following condition is true:
Producer +1 =Consumer

Note that the above statements imply that at least one entry on a queue must be left unused to distinguish a full queue from an empty queue.

Figure 5:
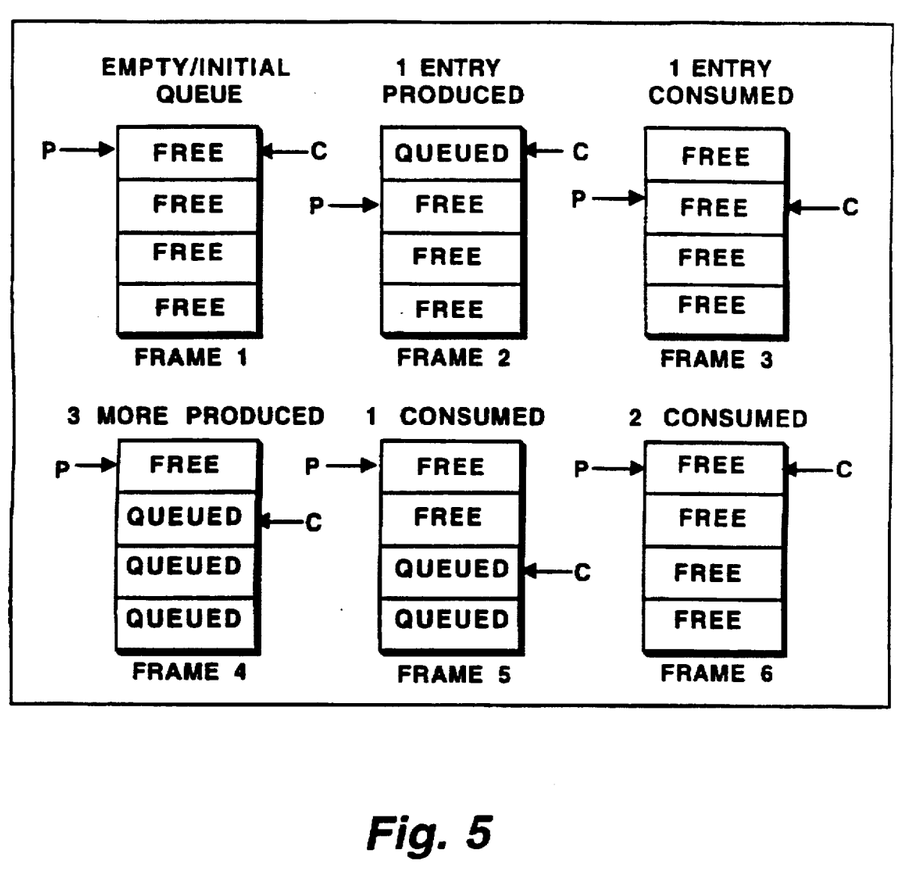
FIG. 5 is a block diagram illustrating circular queue concepts.

FIG. 5 shows the producer and consumer scheme in action. In FIG. 5, "P" refers to a producer index, i.e., the next entry to write; "C" refers to a consumer index, i.e., the next entry to read; "Free" refers to an entry owned by a producer, i.e., a consumer should not read the entry; "Queued" refers to an entry owned by the consumer, i.e., the producer should not disturb the entry. A separate circular queue may be used for each of the directions as either a transmit queue or a receive queue.

In frame 1, the queue is empty because the producer and consumer indices are equal.

In frame 2, the producer has produced a buffer by initializing an entry and incrementing the producer index. The consumer knows that it has an entry to consume because its consumer index is not equal to the producer index.

In frame 3, the consumer has consumed an entry by incrementing its consumer index. The queue has again become empty (the producer and consumer indices are equal).

In frame 4, the producer has produced three entries, which fills the queue (remember, one entry must be left unused to distinguish between a full and empty queue).

In frame 5, the consumer has consumed just one of the three queued entries.

In frame 6, the consumer has consumed the remaining two entries, so the queue is now empty (producer is equal to the consumer)

Figure 4:
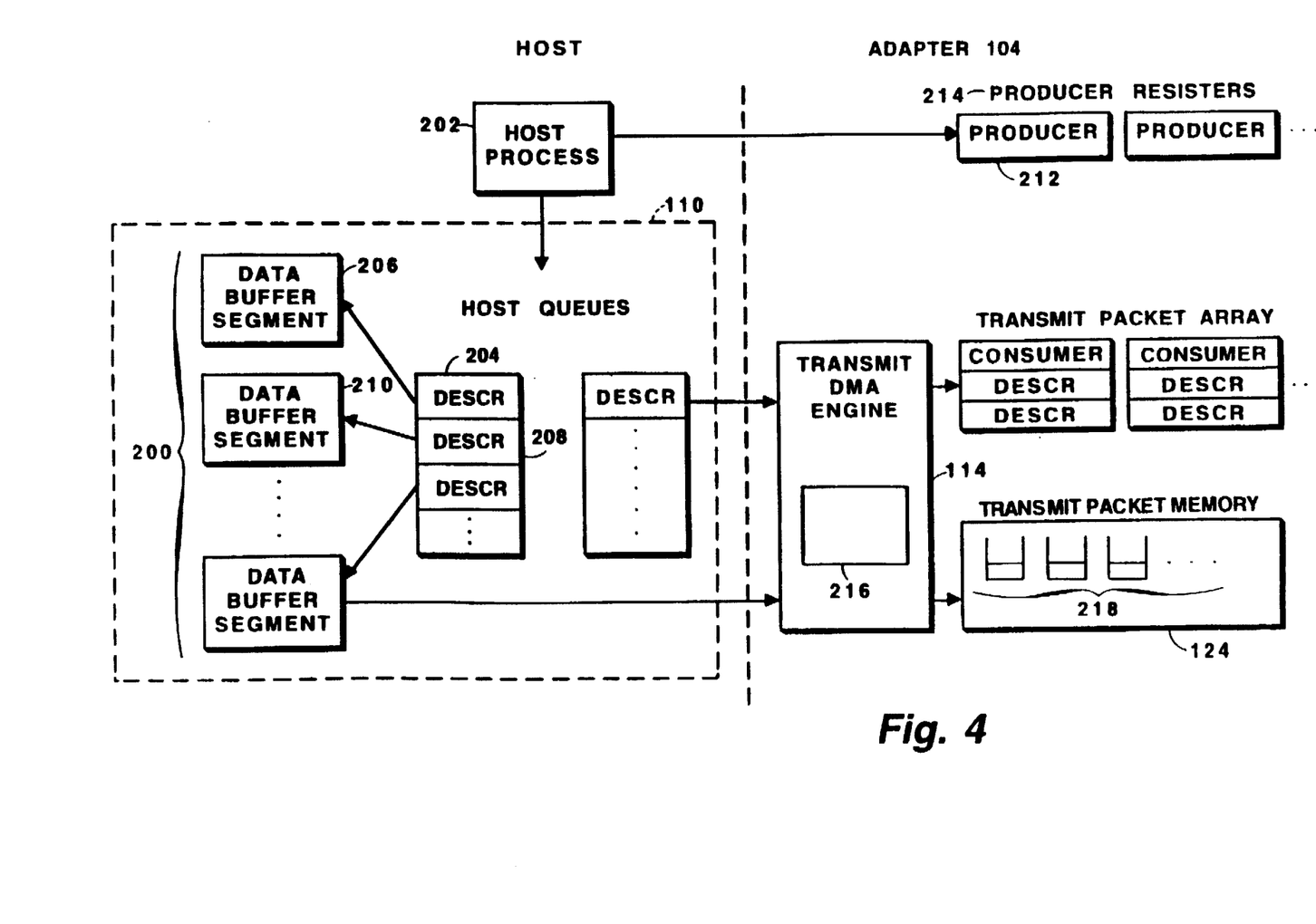
FIG. 4 is a block diagram illustrating the operation of an exemplary DMA Engine.

Referring to FIG. 4, the operation of Transmit DMA engine 114 of FIG. 2 is shown in greater detail. As mentioned above, the adapter 104 contains the transmit DMA engine 114. Data buffer segments 200 (e.g., buffer segment 206 and buffer segment 210) are pointed to and described by buffer descriptors in a host queue. For example, descriptor 204 describes buffer segment 206, while descriptor 208 describes buffer segment 210.

The adapter 104 is capable of directly copying data from buffer segments 200 in the host memory 10 to the adapter's local memory 124 without the intervention of the host processor 202. The data copying operation performed by the transmit DMA engine 114 is triggered when a host software driver advances a producer value 212 to indicate the number of buffer segments 200 which it has posted. The adapter 104 knows it has work to do (i.e., DMA buffer segments) when the producer index is different from its copy of the consumer index.

When the adapter consumes buffers upon transmitting packets, it must inform the host of this fact by generating an interrupt. At this point the host software driver must determine the source of the interrupt and, upon determining that the interrupt is the result of buffer consumption on one or more host transmit queues, must determine the new value of the consumer indices for the queues. If the consumer index is maintained on the adapter, this has to be read by the host driver. In addition, the driver has to determine if this interrupt was for a received packet or transmitted packet. Without DMA of the status information to host memory, these operations typically require several I/O cycles.

The present invention allows the adapter 104 to transfer all pertinent status information to the host memory 110 such that instead of I/O cycles, the host software driver performs memory cycles. Memory cycles are typically an order of magnitude faster than I/O cycles, resulting in fast interrupt processing times and low CPU overhead.

A host software driver for an ATM adapter 104 which does not implement the present invention will have to do the following for each interrupt:

Read an interrupt summary register to find out whether or not the interrupt is being generated by the adapter (and not some other device in the host), and to find out which of the many interrupt sources on the adapter are active (e.g., determine if the interrupt was for transmit or receive);

For each interrupt source associated with a queue-specific event (such as consumption of transmit queue buffers), read the appropriate registers to find out which queue is active, and caused the interrupt;

For each queue, the host driver may also have to read further registers to find the exact nature of the interrupt or to get information about buffer pointers, or in the present invention, with reference to FIG. 5, the consumer values.

In addition, as will be described below, the present invention minimizes spurious interrupts. These can occur for two reasons. First, in a typical system, the interrupt line to the CPU 108 is not synchronized to the DMA data (i.e., status information contained in the host memory Status Block). In other words, although the present invention holds-off interrupts associated with an event until the adapter has completed DMAing the status information related to the event, the adapter cannot guarantee that the data has actually reached host memory before the interrupt is detected by the host CPU 108. For example, the data may be buffered by one or more bus bridges 112. This can cause the interrupt to reach the CPU 108 before the status information on which it is based. When the host software driver reads the Status Block in host memory 110 in response to the interrupt, it will get stale information which may indicate a false source of the interrupt. The present invention contains a delay timer, described with reference to FIG. 8 below, which can be programmed by the host software driver to delay the interrupt up to 256 microseconds after its related Status Block update, thereby ensuring proper sequence.

The second source of spurious interrupts is due to the fact that DMA transfers cannot occur in zero time. One possible configuration of the host memory Status Block, by way of example, is presented below.

Word 0 = Receive consumers for queues 0–3
Word 1 = Receive consumers for queues 4–7
Word 2 = Receive queue status
Word 3 = Interrupt summary status
Word 4 = Transmit queue status
Word 5 = Transmit consumers for queues 0–3
Word 6 = Transmit consumers for queues 4–7
Word 7 = Transmit consumers for queues 8–11
Word 8 = Transmit consumers for queues 12–15
Word 9 = Transmit consumers for queues 16–19
Word 10 = Transmit consumers for queues 20–23
Word 11 = Transmit consumers for queues 24–27
Word 12 = Transmit consumers for queues 28–31
Word 13 = Reserved
Word 14 = Reserved
Word 15 = Reserved As can be seen, the consumer values are transferred along with a summary word (i.e., word 3) which indicates which of the queues are currently interrupting. The explanation of producer/consumer scheme was discussed above with reference to FIG. 5.

The possibility of spurious interrupts exists due to the fact that the DMA transfer cannot occur in zero time. While the update of the status block in host memory via DMA is taking place, the information in the Status Block can change causing inconsistencies between the summary word and the consumer values. For example, suppose that notification of the incrementing of the consumer index associated with receive queue 0 is the only pending interrupt. During a DMA update, word 0 is transferred over the bus to the host memory 110 with the latest consumer values for queues 0 through 3. After this transfer, and before word 2 is transferred, if an interrupt occurs on queues 1 through 3, the queue status summary will indicate the interrupt. However, the consumer values for those queues have already been sent and reflect the values before the interrupt. This causes a spurious interrupt. The work associated with the queues 1 through 3 would have to be processed on a subsequent interrupt.

A similar problem exists on the transmit side, only the situation is reversed. Here, the queue status word is transferred first so the problem is that the consumer values could be newer than what the queue status indicates.

To correct these problems, one could take a snapshot of the information before the DMA is initiated, thereby guaranteeing that no information changes in the middle of an update. However, this snapshot scheme creates yet another problem. Understanding this new problem requires some explanation of how an interrupt is cleared in the producer/consumer model.

On the receive side, when a queue is activated, the driver 'produces' empty buffers to allow data to be received by writing a producer index to the adapter 104. When data is received, the adapter 104 'consumes' these buffers by updating its consumer values. The host software driver reads the data in the buffers, thus 'emptying' them and reclaims the buffers by writing a 'completion' index to the adapter 104. When the adapter 104 updates its consumer values, it generates an interrupt indicating to the host software driver that data is available. The host software driver acknowledges the interrupt and clears it by writing the completion value. If the completion value is equal to the consumer value, the interrupt is cleared. If however the consumer value has advanced due to more data being received, the interrupt is not cleared. Whenever the consumer and completion indices are unequal, the adapter will continue to interrupt the host.

Similarly, on the transmit side, the host software driver produces buffers when there is data to be transmitted. The adapter 104 consumes the buffers by advancing its consumer index. When a buffer is consumed, an interrupt is posted indicating to the host software driver that data has been transmitted. The host software driver writes a completion value when it reclaims the now empty buffers. If the adapter 104 in the meantime has transmitted or consumed more buffers, the consumer value does not match the completion value written by the host software driver and the interrupt is not cleared.

Referring to FIGS. 6A–6E, the problem with the snapshot method is illustrated in the following scenario. Information flow is from left to right.

Figure 6A:
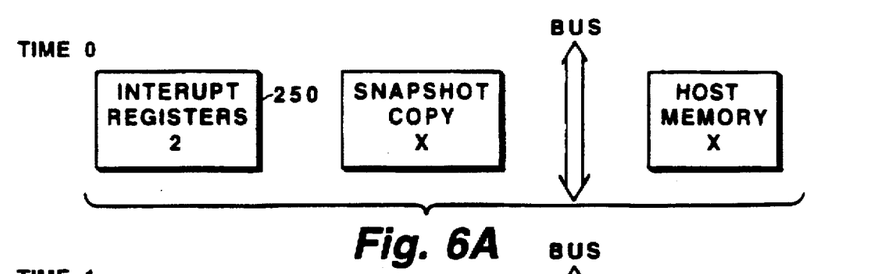
FIG. 6 is a block diagram illustrating the snapshot method.
Figure 6B:
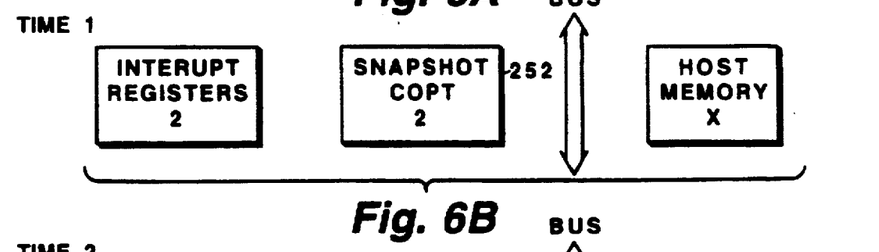
Figure 6C:
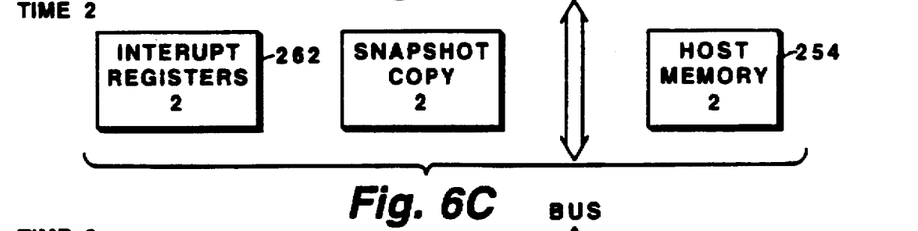
Figure 6D:
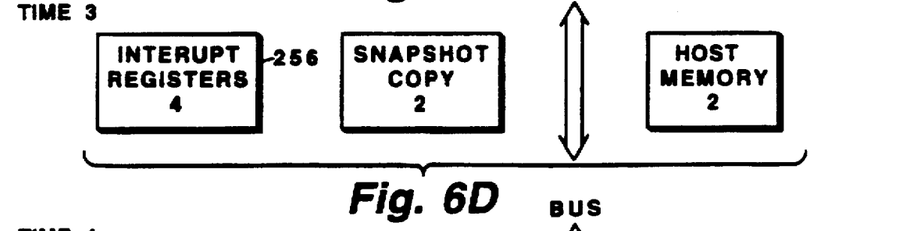
Figure 6E:
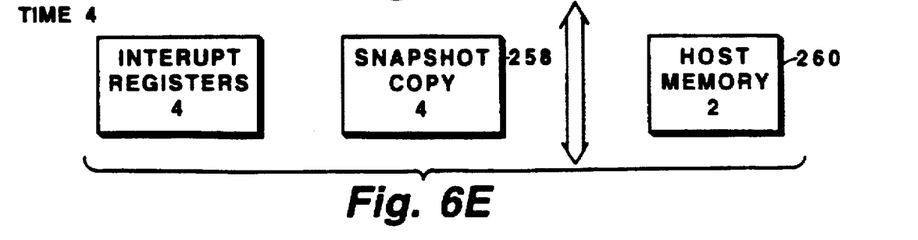

In FIG. 6A, at time 0, a queue's consumer index 250 was updated to a value of 2. In FIG. 6B, at time 1, the snapshot 252 is made and transferred to the host memory 254 in FIG. 6C at time 2. In FIG. 6D, at time 3, the same queue's consumer index 256 is incremented to 4, again a snapshot 258 is made in FIG. 6E at time 4 in preparation for transferring the data to host memory 260. Also in FIG. 6E at time 4, the host software driver reads host memory in response to the interrupt generated at time 2 in FIG. 6C, sees a consumer index value 252 of 2, and tries to reclaim the buffer by writing a completion value of 2. However, the snapshot copy 258 has already updated to a value of 4 so when the completion value of 2 is written, the interrupt is not cleared. The value of 4 has still not been transferred to the host memory due to the system bus being busy. This sequence of events results in a spurious interrupt, since the interrupt should be cleared when the completion value of 2 is written, but instead it stays set. If the host CPU responds to the interrupt, it will find that the Status Block in host memory indicates that no work is to be done (since the consumer value remains at 2 as last DMAed by the adapter). This condition will exist until such time as the system bus is free and the value of 4 can be transferred to the host memory. As stated previously, this time is variable and can be relatively large.

The present invention prevents this case from occurring by not making a snapshot of the data, but instead copying one word at a time as that word is transferred over the system I/O bus 106. In systems where a single DMA burst cannot be interrupted, the possibility of spurious interrupt for this case goes to 0. In other systems, the window of opportunity for a spurious interrupt to occur will be greatly reduced over other implementations. The size of this window is determined by the 10 time between transferring the queue interrupt status (indicating only that a queue's consumer has been incremented) and transferring its associated consumer value.

How a consumer index update occurs and the events that are triggered by that update in the present invention will now be described. The Status DMA Engine 156 (hereinafter "SDE") keeps two 8-bit Consumers per queue: A Host__Consumer and an Adapter__Consumer. Adapter__Consumer is the adapter's own copy of the consumer of a queue. Host__Consumer represents the value of the consumer for a queue which was last written to the host by the adapter via DMA. The adapter increments the transmit Adapter__Consumers as it transmits packets, and increments the receive Adapter__Consumers as it DMAs received packets to host memory. Whenever a Status Block update takes place, the host memory is updated with the values in the Adapter__

Consumers, and the Adapter_Consumers are copied to the Host_Consumers. The copy operation is done one word at a time and also that word is transferred over the system I/O bus as described earlier.

Figure 7:
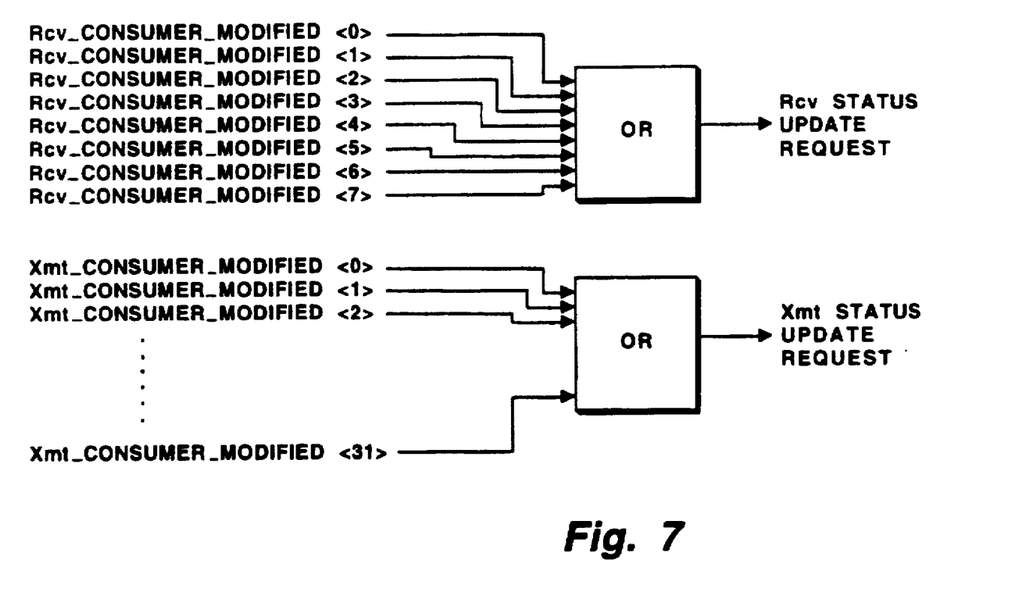
FIG. 7 is a block diagram illustrating the generation of Status Block update requests by the receive and transmit processes.

Status Block update requests are generated when Adapter_Consumer for a queue does not equal Host_Consumer for the queue. Rather than continuously comparing the two sets of registers to each other, this function is implemented through the use of a "consumer_modified" bit per queue. Whenever an Adapter Consumer is incremented, SDE sets the appropriate consumer_modified bit. If any consumer_modified bit is set, a Status Block update request is generated for the corresponding process (RCV or XMT). All the consumer_modified bits are cleared when a Status Block update occurs. This scheme is depicted in FIG. 7.

The SDE must generate IOC (Interrupt On Consumption) interrupts whenever the Completion index of a queue does not equal the Host_Consumer for the queue (indicating that there is work for the driver to do). The completion index is one which the host uses to communicate to the driver as to how much of the outstanding work has been completed. Since neither the Completion nor the Consumer indices are ever decremented, and since the host must not allow the Completion index to pass the Consumer index, the SDE does not store Completion indices. Rather, it generates interrupts (per queue) whenever a Status Block update takes place, and clears interrupts (per queue) whenever a Completion register is written with a value equal to the Host_Consumer for the queue. Thus, there is a reliable indication of what the basis of the interrupt of the host is for—based on observing the Host_Consumer, we know whether work is pending. The value of Host_Consumer is kept current until just before the consumer index is transferred via DMA to the host memory.

The method used to generate Status Block update requests and to generate and clear IOC interrupts may thus be summarized as follows:

1) Whenever any Adapter_Consumer for any queue is incremented, a Status Block update request from the queue is generated.

2) Once the Status Block update has taken place, an IOC interrupt from the queue is generated.

3) When the host writes a Completion index, if an IOC interrupt for the queue with which the index is associated is being generated, the interrupt is cleared if the value written is equal to Host_Consumer for the queue.

Any condition that can cause an interrupt has associated with it an interrupt bit in an interrupt register. Writing a 1 to a specific bit in an interrupt register resets that interrupt bit. In addition, certain interrupts (such as IOC interrupts) have information such as queue numbers associated with them. The contents of the interrupt registers and any additional interrupt-related information are DMA'd to the Status Block in host memory. The Interrupt summary word (in the Status Block) contains summary bits for all interrupts. This ensures that the driver can obtain all pertinent information from one longword.

Any internal module in the adapter that needs to generate an interrupt reports the interrupting condition to the SDE, which in turn requests a bus transfer and updates the host Status Block. An interrupt request is then generated. When a client reports an interrupting condition:

a bit in the appropriate interrupt register is set, a Status Block update request is generated, once the Status Block has been updated, an interrupt request is generated if interrupt is enabled for that condition, the bit is cleared when the driver writes a 1 to that bit position in the appropriate register.

Figure 8:
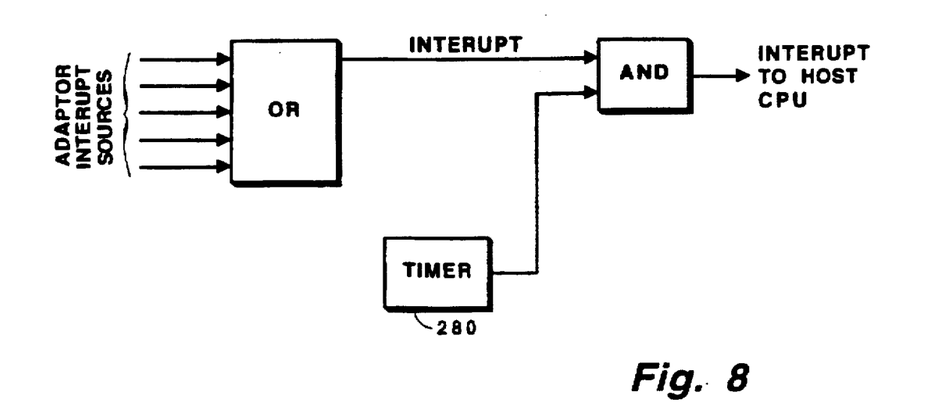
FIG. 8 is a block diagram of a timer which is provided to delay the IRQ from the end of a Status Block update.

Since the host software driver reads the host memory upon an interrupt, a possibility exists that the host CPU may detect the interrupt before the DMA of the Status Block is completed. This condition may be, for example, caused by write buffers in bus bridge chips which may not be synchronized with the IRQ line. Referring to FIG. 8, to reduce the possibility of spurious interrupts due to the above condition, a timer 280 is provided to delay the IRQ from the end of a Status Block update. This timer 280 is programmable from 0 to 255 microseconds in units of microseconds. The timer 280 is in the interrupt path to the host CPU, and is automatically reloaded at the end of an interrupt cycle (i.e., when IRQ clears) such that the next IRQ will again be delayed by the programmed value.

Having described a preferred embodiment of the invention, it will now become apparent to those skilled in the art that other embodiments incorporating its concepts may be provided. It is felt therefore, that this invention should not be limited to the disclosed invention, but should be limited only by the spirit and scope of the appended claims.

What is claimed is:

1. A asynchronous transfer mode (ATM) network station in an ATM network comprising:

a host, the host having a central processing unit (CPU) connected to a host memory, a bridge, and a system input/output (I/O) bus;

an adapter, the adapter connected to the host via a system bus, the adapter having a direct memory access (DMA) engine, a transmit packet memory, a control logic having a status DMA engine, and a link interface;

means, in the host memory, for maintaining status information of a plurality of interrupts through the use of a plurality of memory cycles and without the intervention of the CPU; and a communication line from the link interface to the ATM network, wherein the means for maintaining status information comprises:

a status block in the host memory;

a status DNA engine (SDE) in the adapter;

a plurality of host_consumer indices, in the SDE, corresponding to a plurality of queues in the host memory, each one of the host_consumer indices representing a value of a consumer index of one of said queues which was last written to the host by the adapter via DMA;

a plurality of adapter_consumer indices, in the SDE, corresponding to the plurality of queues in the host memory, each one of the adapter_consumer indices representing a copy of a consumer of one of said plurality of queues in host memory;

means, in response to a status block update in the status block, for updating a plurality of values in the adapter_consumer indices; and means for copying the values of the adapter_consumer indices to consumers_indices.

2. The asynchronous transfer mode (ATM) network station in an ATM network according to claim 1 wherein the means for updating comprises:

means, in response to one of the adapter_consumer indices being incremented, for setting a plurality of consumer_bit modified indices in the SDE; and means for generating a status block update.

3. The asynchronous transfer mode (ATM) network station in an ATM network according to claim 2 wherein the means for generating the status block update comprises an interrupt in response to one of a plurality of completion indices not equaling a corresponding one of the host_consumer indices.

4. A method of updating a status information block in a memory of an ATM network station comprising the steps of:

providing a host, the host having the memory, the memory having a plurality of queues;

providing an adapter, the adapter having a DMA engine and a logic having a status DMA engine register;

providing a system bus for connection of the adapter to the host;

providing the status DMA engine register with a consumer index;

maintaining a plurality of host_consumer indices and adapter consumer_indices corresponding to each one of the plurality of queues; and generating a status block update when one of the adapter_consumer indices does not equal one of a corresponding host_consumer index for one of the queues, said step of generating a status block update including the steps of:

generating a status block update request whenever one of the adapter consumer indices for one of the corresponding queues is incremented;

generating an interrupt on completion; and clearing the interrupt if the value of a completion index of one of the plurality of queues is equal to the value of a corresponding host_consumer index.

* * * * *